United States Patent [19]

Crick et al.

[11] 4,384,214
[45] May 17, 1983

[54] NON-INTERRUPTING POWER SUPPLIES FOR LOADS OF LESS THAN 500 WATTS

[75] Inventors: Robert G. Crick, San Diego, Calif.; Michael J. Dewey, Tempe; Larry P. Jamison, Mesa, both of Ariz.

[73] Assignee: Integrated Switching Supplies, Inc., Scottsdale, Ariz.

[21] Appl. No.: 289,827

[22] Filed: Aug. 3, 1981

[51] Int. Cl.³ .............................................. H01F 1/00
[52] U.S. Cl. .................................................... 307/66
[58] Field of Search ............................ 307/64, 66, 67

[56] References Cited

U.S. PATENT DOCUMENTS

| | | | |
|---|---|---|---|
| 3,609,386 | 9/1971 | Patlach | 307/66 |
| 4,122,359 | 10/1978 | Breikss | 307/64 |
| 4,143,283 | 3/1979 | Graf et al. | 307/66 |
| 4,181,842 | 1/1980 | Elias et al. | 307/66 |

Primary Examiner—Donald A. Griffin
Attorney, Agent, or Firm—Harry M. Weiss

[57] ABSTRACT

The distinguishing feature of so-called no break or non-interrupting power supplies over ordinary standby or emergency power systems is that no supply interruption (even momentary) occurs when the commercial power source fails or when commercial power again becomes available. This invention comprises a non-interrupting modular power supply system which can be configured for loads of from 15 to 100, watts or for 75 to 500 watts, respectively. The system combination supplies single or multiple regulated DC outputs meeting the requirements of the equipment being operated. A source of AC power is converted to DC for utilization by a load and for charging a back-up battery. When the source of AC power fails, the battery supplies power to the load. Means are provided to monitor the battery voltage to control its charging.

7 Claims, 8 Drawing Figures

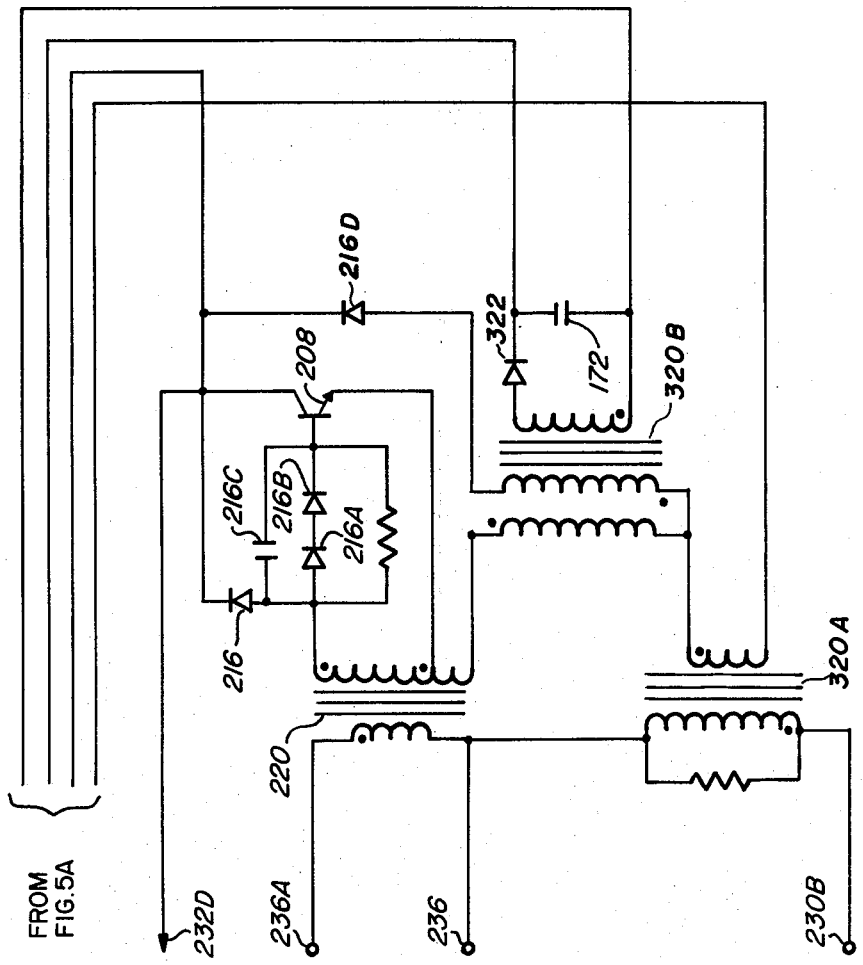

NON-INTERRUPTING POWER SUPPLIES FOR LOADS OF LESS THAN 500 WATTS

BACKGROUND OF THE INVENTION

1. Field of the Invention

This invention relates to a method and means of providing an uninterrupted voltage regulated power supply for electronic equipment having a critical need; therefore, such as point of sale computers, other devices with volatile electronic memories, sequential or numerical control processes where supply voltage interruption could cause malfunction, hazard or equipment damage, and security systems where a power interruption could cause a non-alarm or a false alarm situation.

2. Description of the Prior Art

The use of standby or emergency power sources to protect critical loads has been a common practice for many years. Telephone companies have traditionally used 48 volt lead acid battery banks which are automatically charged from commercial power sources for PBX and central exchange operation to reduce the effect of power outages. Other areas where continuity of power supply is a critical requirement but where momentary voltage dropouts can be tolerated include airport control towers, communication centers, aircraft runway and landing lights, navigational aids, hospital operating theaters, security lights in department stores, etc. These facilities are usually equipped with gasoline engine generating sets which can assume critical loads in a matter of five to twenty-five seconds.

Engine alternator sets are usually designed to supply loads of from 5 to 150 kilowatts (or more if required). Standby or emergency generators also include load transfer relays, reliable automatic engine starters and periodic line voltage sampling facilities. Loads are not usually returned to the commercial supply until after observation of 10 to 15 minutes of uninterrupted line voltage.

Large digital computer installations generated a requirement for no-break multi-kilowatt emergency power supplies. The no-break feature can be implemented with a continuously running motor-alternator set, coupled to an inertial flywheel supply which in turn is coupled to a gasoline engine through an overrunning clutch. When the power fails, the engine starts and picks up the load through the overrunning clutch before the motor-alternator loses more than five cycles in RPM or 10 percent in line voltage. When the commercial power returns, the motor picks up the load and the engine shuts down.

The use of battery power to back up no-break supplies of 5 kw and up involves large and heavy battery installations which must be integrated into the supply chain to avoid even a momentary voltage interruption at the time of power failure.

For example, a battery back-up to maintain a 10 kw load for one hour would require 96 volts of 200 ampere hour batteries and would probably include rotating equipment, whereas the state of the art presently will allow a no-break battery back-up system of 5 kilowatts or less to operate with solid state converters.

SUMMARY OF THE INVENTION

This invention provides power supplies for equipment with power requirements of 15 to 500 watts and regulated single or multiple DC inputs.

A battery pack is integrated into the power supply system to assume the equipment load without any interruption in current supply and with a voltage variation of less than minus ten percent. The battery pack is configured in each case to maintain equipment operation for one hour or more during commercial power outages.

While details of the converters, secondary regulators and battery packs will differ for the low and medium power supply systems, both systems will utilize the same control circuit. For example, the low power no-break system (15 to 100 watts) will use a single transistor flyback converter with an integrated high-efficiency switching regulator providing one or more DC outputs. The battery pack will be gel/cell or nickel cadmium, whichever can conveniently meet or exceed the one hour power outage specification based on customers equipment consumption requirement. The medium power no-break power supply system (75 to 400 watts, nominal, 500 watts peak) will use a single transistor forward converter with post regulation to one or more secondary outputs. A sealed lead acid battery will be used with the ampere hour rating tailored to the equipment one hour requirement.

It is, therefore, an object of this invention to provide a reliable power supply of from 15 to 500 watts which will continuously and without interruption provide power at the correct voltage or voltages and polarities for a period of one hour or more following failure of a commercial power source.

It is another object of this invention to provide a special purpose control circuit, fabricated as a thick film discrete hybrid assembly for use in each modulator converter and battery back-up variant.

It is a still further object of this invention to provide a multiple output, battery backed-up power supply system with modular sub-system which can be configured to meet the specific power range requirements of various equipment loads.

It is still another object of this invention to provide an integral housekeeping function operated from the rectifier side of the commercial power input which can sense an impending power failure and start the battery power up-converter, indicate that the supply is on battery power, shut the battery converter down when commercial power returns or warn the supply user that battery discharge will become imminent so that data in the memory can be transferred and orderly shut down of the computer can take place.

According to a broad aspect of the invention there is provided a non-interrupting power supply for supplying DC power to a load, comprising: input means adapted to be coupled to a source of AC power; first means coupled to said input means and to said load for converting said AC power to DC power for utilization by said load; second means for storing DC power; charging means coupled to said input means and to said second means for charging said second means; third means coupled to said input means and to said second means for sensing the failure of said source of AC power; and fourth means coupled to said first means and to said second means and responsive to said third means for supplying power from said second means to said first means upon failure of said source of AC power.

According to a further aspect of the invention there is provided a method of supplying continuous DC power to a load, comprising: converting AC line power to DC power for utilization by said load; converting said AC line power to DC power for charging a battery; sensing the failure of said AC line power; supplying power from said battery for utilization by said load upon failure of said AC line power; and regulating the DC power supplied to said load in accordance with load requirements.

Still other objects, features and advantages of the invention will become apparent to those skilled in the art from a reading of the following detailed description taken in conjunction with the accompanying drawings.

BRIEF DESCRIPTION OF THE DRAWINGS

FIGS. 5A, 5B, and 5C are schematic diagrams of the up-converter designed for driving the forward converter during periods of commercial power unavailability, the battery charger converter and the battery state controller.

DESCRIPTION OF THE PREFERRED EMBODIMENT

Figure 1:
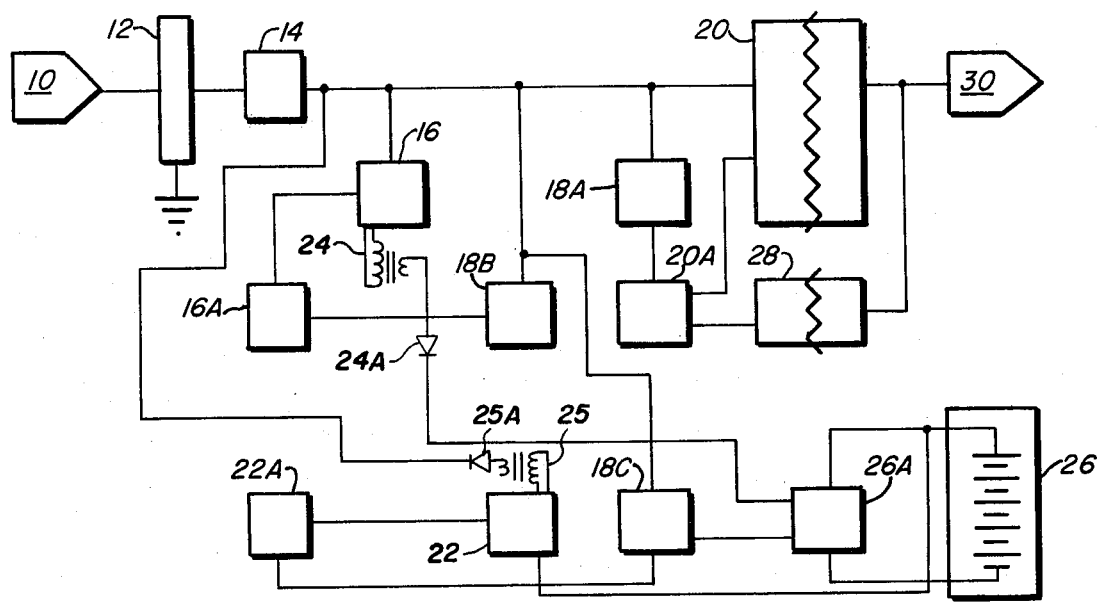
FIG. 1 is a block diagram of the preferred embodiment of a single voltage DC power supply with an integrated no-break battery backup system.

FIG. 1 illustrates the functional relationship of various components of the no-break battery backed power supply. Connection to the commercial power service is shown at 10. A radio frequency interference filter is shown at 12. The converters in the power supply operate at 20 khz and an RFI filter is needed to keep the HF converter voltage out of the power service. A full wave bridge rectifier is shown at 14. No 60 Hz transformer is used with the power supply so a wide range of line voltages and frequencies can be accomodated. The bridge rectifier can operate on from 85 to 260 input AC volts. Closure of two terminals in the rectifier allows the supply to operate as a voltage doubler in conjunction with suitable capacitors on input voltages of 90 to 132 volts. All commercially used power line frequencies of 40 to 440 hertz can be used without circuit modification. The high-voltage DC supply (ca 200 to 400 volts) powers the main supply converter 20 which operates at 20 Khz. The converter transformer has an isolated secondary winding so either the positive or negative output terminal can be grounded and the converter output is isolated from the AC power supply as indicated by the zigzag line across 20 and 28. An optoelectronic isolator is used at 28 to feed the voltage regulator signal to the variable width pulse circuit 20A which controls the transistor base drive of the main converter. A 15 volt housekeeping supply is used throughout the no-break converter as shown at 18A, 18B, and 18C. The housekeeping supply consists essentially of dropping resistors working into zener diodes. The current requirement of the pulse modulators and controllers has been kept low so the power loss in the dropping resistors is low. The avoidance of a requirement for a low voltage 60 Hz transformer for the housekeeping supply simplifies operation of the power supply from the battery source during power failures. The battery 26 is charged and discharged as required by external events, in accordance with controller 26A. When the battery 26 (which in a standard installation is nominally 48 volts) is operating the main converter 20, an up-converter 22 is isolated from AC input signals by the series connection of transformer 24 and rectifying diode 24A. The base of up-converter 22 is driven by pulse generator 22A and its output is adjusted to match the missing line voltage. The battery 26 is either trickle or boost charged by converter 16 and pulse driver 16A. Converter 16A is AC isolated from the controller through the series connection of transformer 25 and rectifying diode 25A.

Figure 2:
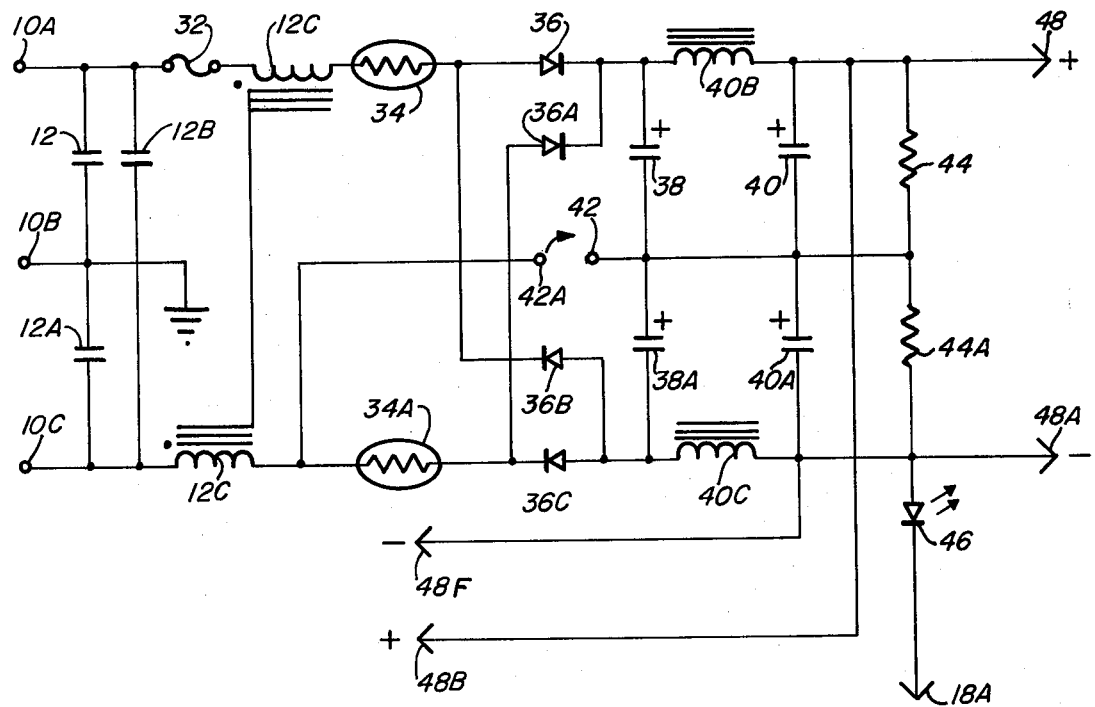
FIG. 2 is a schematic diagram of a transformerless power supply, showing a radio frequency interference filter, a fullwave bridge rectifier with filter and an alternate voltage doubler option.

FIG. 2 is a schematic diagram of the power rectifier and other elements of the converter. Commercial power input is at terminals 10A and 10C, an external ground to the converter frame is available at 10B. An RFI filter is made up of 0.01 1 KV ceramic capacitors 12, 12A, and 12B connected from each input to the frame ground and across the line as shown. Further attenuation of the 200 Khz converter frequency is provided by 20 line chokes 12C which are wound on a common ferrite core and are rated at 6 amperes. Impedance limiting resistors 34 and 34A each have a value of 4.5 ohms and are provided to reduce the peak charging current into filter and voltage doubler capacitors 38, 38A and 40, 40A. Item 32 is a protective fuse which should be rotated at 5 amps for 220 volt operation and 10 amps for operation on 110 volts. Power diodes 36, 36A, 36B and 36C are type MR504 connected in a fullwave bridge circuit. Series connected capacitors 38 and 38A have a value of 47 uf and are rated at 200 volts. Filter chokes 40B and 40C each have a value of 12 mh and are connected ahead of series connected filter capacitors 40 and 40A each with a value of 750 uf and a voltage rating 180 volts. The center connections of capacitors 38, 38A, 40 and 40A are connected to terminal 42. Terminal 42A is connected on one side of the input line between choke 12C and series resistor 34A. When terminals 42 and 42A are jumpered, the voltage between input terminals 10A and 10B and output terminals 48 and 48A is essentially doubled, permitting the converter to be operated on a 110 volt service connection. Series connected resistors 44 and 44A are each 22K ohms, rated at 2 watts. One end of R44 is connected to the positive high-voltage supply. The other end of R44 is connected to R44A and to the center connection of capacitors 40 and 40A. The other end of R44A is connected to the anode terminal of LED 46 which shows that the power supply is energized. The cathode of LED 46 is connected to output terminal 18A, first mentioned in FIG. 1 to provide one of the DC housekeeping supplies used in the converter. The positive DC outputs are shown at 48 and 48B, and the negative outputs are at 48A and 48F. One or both sides of the rectifier circuit is "hot" to ground, depending upon whether a 110 volt or a 220 volt supply is used. This factor has been recognized in construction of the no-break converter.

Figure 3:
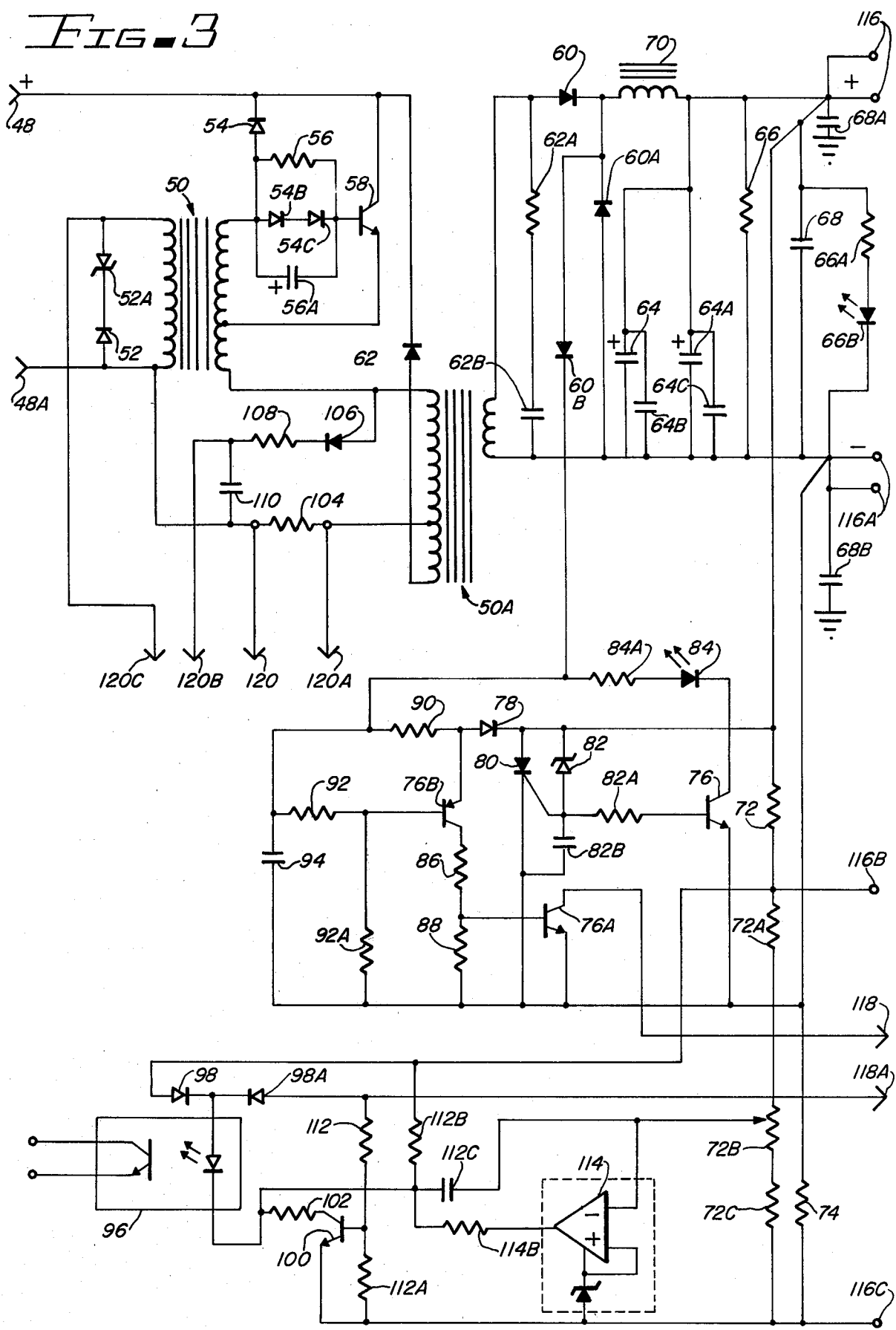
FIG. 3 is a schematic diagram of the main forward converter with over voltage protection and a voltage regulator circuit.

FIG. 3 is a schematic diagram of the main power converter which converts the rectified and filtered commercial power at about 300 volts to either 5, 12, 24 or 48 in accordance with end user requirements. In an example of a medium power converter embodiment, 220 watts of primary input becomes 175 watts of low-voltage DC output. FIG. 3 also includes a crowbar circuit which in the 5 volt converter, cuts off the output at 5.6 volts and a voltage regulator circuit which is coupled to the pulse generator through an opto-electronics isolator.

The positive converter input current lead 48 is connected to the collector terminal of transistor 58 and to the cathodes of diodes 54 and 62. Transistor 58 is an MJ12005 which is an 8 ampere NPN device with a peak collector-emitter rating of 1500 volts. The anode of diode 54 is connected to the base of transistor 58 through two anode to cathode connected diodes 54B and 54C. Diode 54 is a type MR 817 and diodes 54B and 54C are 1N 4001s. Diodes 54B and 54C are shunted by resistor 56 which has a value of 100 ohms and capacitor 54A which has a value of 220 UF an a rating of 16 volts. The anode of diode 62 is connected to one end of the primary windings of power transformer 50A. The opposite end of the primary of transformer 50A is connected to the emitter of transistor 58 through one end turn of the secondary of base driver transformer 50. The center tap of power transformer 50A is connected to the negative current lead 48A from the rectifier through one watt current sensing resistor 104 which has a value of 0.1 ohm. Test points on resistor 104 provide for external metering of converter current. The end of resistor 104 connected to negative current lead 48A originates external lead 120, and the end of resistor 104 connected to transformer 50A primary center tap originates external lead 120A. Negative current lead 48A is also connected to one end of base driver transformer 50. The opposite end of base driver transformer 50 originates external lead 120C. The primary of base driver transformer 50 is shunted by zener diode 52A and diode 52. Zener diode 52A is a 15 volt type 1N5295 and diode 52 is a 1N4148, both of which serve to limit the base driver to transistor 58. The end of the primary of power transformer 50A connected to one end of the secondary of base driver transformer 50 is also connected to external lead 120B through diode 106 and a 220K ohm resistor 108. Diode 106 is a type 1N4006. External lead 120B is bypassed to negative current lead 48A by capacitor 110 which has a value of 0.1 uf.

For 5 volt operation, the secondary of power transformer 50A is wound for a peak current of 65 amperes. For 12 volts, the secondary should be rated at 28 amperes, 24 volts—14 amperes and 48 volts—7 amperes. The current leads to the power supply output should be rated accordingly. One end of power transformer 50A secondary is connected to the anode of power supply diode 60. Diode 60 is a 50 HQ 030. The secondary of transformer 50A is shunted by 4.7 ohm resistor 62A and 0.02 uf capacitor 62B which functions as a high-frequency spike supressor. The cathode of diode 60 is connected to one terminal of 30 uh choke 70 which for 5 volt operation is rated at 65 amps. The other terminal of choke 70 is connected to positive output terminals 116. The cathode of power diode 60 is also connected to the cathode of power diode 60A, the anode of which is connected to the negative output lead. The negative output from the secondary of transformer 50A is connected to terminals 116A. Four high-value electrolytic capacitors are connected from the positive output lead to the negative output lead. In the 5 volt configuration, the the energy storage capacitors 64, 64A, B and C are 4700 UF each, with a voltage rating of 6.3. For higher voltage and lower current power supply outputs, alternate values of choke 70 and capacitors 64, 64A, 64B and 64C are used. A 33 ohm bleeder resistor 66A is connected across the positive and negative output terminals 116 and 116A. LED 66B and 470 ohm resistor 66A indicate when the power supply is energized. No part of transformer 65A secondary or circuitry associated therewith is connected to ground or to the converter frame, however. 1 uf, 100 volt capacitors 68A and 68B are connected from the positive and negative terminals to the converter frame. Another 0.1 uf 100 volt capacitor 68 is connected from the positive to the negative output terminals 116 and 116A.

The positive output voltage lead is connected to 4.7 ohm resistor 72, to the cathode of 5.6 volt 1N232 zener diode 82, to the cathode of 1N4148 diode 78 and to the anode of type C122F-1 SCR 80. The remaining end of resistor 72 is connected to one end of 10K ohm resistor 72A, to a power supply control terminal 116B, to one end of 750 ohm resistor 112B and to the anode of diode 98. The anode of zener diode 82 is connected to the gate of SCR 80, to one end of 47 ohm resistor 82A, and to one terminal of 0.1 uf, 100 volt capacitor 82B. The other terminals of capacitor 82B is connected to the negative power supply and to the cathode of SCR 80. Resistor 82A is in turn connected to the base of a type MPS5172, NPN transistor 76. The emitter of transistor 76 is connected to the power supply output negative lead and the collector of transistor 76 is connected to the cathode of LED 84. The anode of LED 84 is connected to 1000 ohm resistor 84A which in turn is connected to one end of 22K ohm resistor 90, 100k ohm resistor 92, one terminal of 0.1 uf 100 volt capacitor 94 and to the cathode of 1N4148 diode 60B. The anode of diode 60B is connected to the cathode of power rectifier diode 60.

The other end of capacitor 94 is connected to the converter negative output lead. The other end of resistor 92 is connected to the base of a type MPS 2907, PNP transistor 76B and to one end of 470 ohm resistor 92A, the other end of which is also connected to the converter negative output lead. The other end of resistor 90 is connected to the emitter of transistor 76B and to the anode of 1N4148 diode 78, the other end of which is connected to SCR 80 and to the positive converter power output lead. The collector of transistor 76B is connected to 100k ohm resistor 86 which in turn is connected to 10k ohm resistor 88 which is connected to the converter negative lead. The center connection between resistors 86 and 88 is connected to the base of a type MPS 2222 NPN transistor 76A. The emitter of transistor 76A connected to the converter negative supply lead and the collector is connected to external control line 118 which is connected to a plus voltage source within the load being supplied by the power converter. The function of transistors 76, 76A, 76B, SCR 80, zener 82, LED 84, diodes 78 and 60B, with associated resistors and capacitors is to detect over voltage and power failures to the converter load.

The remaining components shown in FIG. 3 are provided to regulate the converter voltage on the isolated side of the output. Resistor 72, (4.7 ohms) is connected from the positive converter output terminal to one end of 10k ohm resistor 72A, to external conection point 116B, to 750 ohm resistor 112B and to the anode of 1N4148 diode 98. The other end of resistor 72A is connected to a 5000 ohm adjustable resistor 72B which in turn is connected to 10k ohm ½ watt resistor 72C. The other end of resistor 72C is connected to external connection point 116C, to 4.7 ohm resistor 74, to the anode of 2.7 volt zener diode 114A, to one end of 10K ohm resistor 112A and to the emitter of type MPS5172 NPN transistor 100. External connection 116C and the components mentioned above are also connected to the converter negative lead through 4.7 ohm resistor 74. The cathode of diode 98, the anode of which is connected to the positive converter output through resistor 72 is connected to the light generator anode of the MCT2E optical coupler 96 and to the cathode of a 1N4148 diode 98A.

The cathode of the light generator element in optical coupler MCT2E is connected to the collector of transistor 100 through 620 ohm resistor 102. The cathode of the light generator element in MCT2E is also connected to 22 ohm resistor 114B, 750 ohm resistor 112B and one terminal of 0.1 uf capacitor 112C. The anode of diode 98A is connected to an external control line 118A and to one end of 10K ohm resistor 112. The other end of resistor 112 is connected to the base of transistor 100 and to another 10K ohm resistor 112A which is connected to common negative terminal 116C. The other end of resistor 114B is connected to the output and positive supply terminal of TL430 operational amplifier 114. The negative input of op amp 114 is connected to the movable arm of adjustable resistor 72B and to the other terminal of capacitor 112C. The positive input to op amp 114 is connected to the cathode of zener diode 114A and to the negative supply terminal of op amp 114. The movable arm on 5k ohm resistor 72B permits a selected fraction of the converter output voltage to be applied to the negative input of op amp 114 which establishes the output voltage of the converter. Application of a positive voltage equal to the converter output to control line 118A will inhibit the function of the voltage controller and produce full output.

Figure 4:
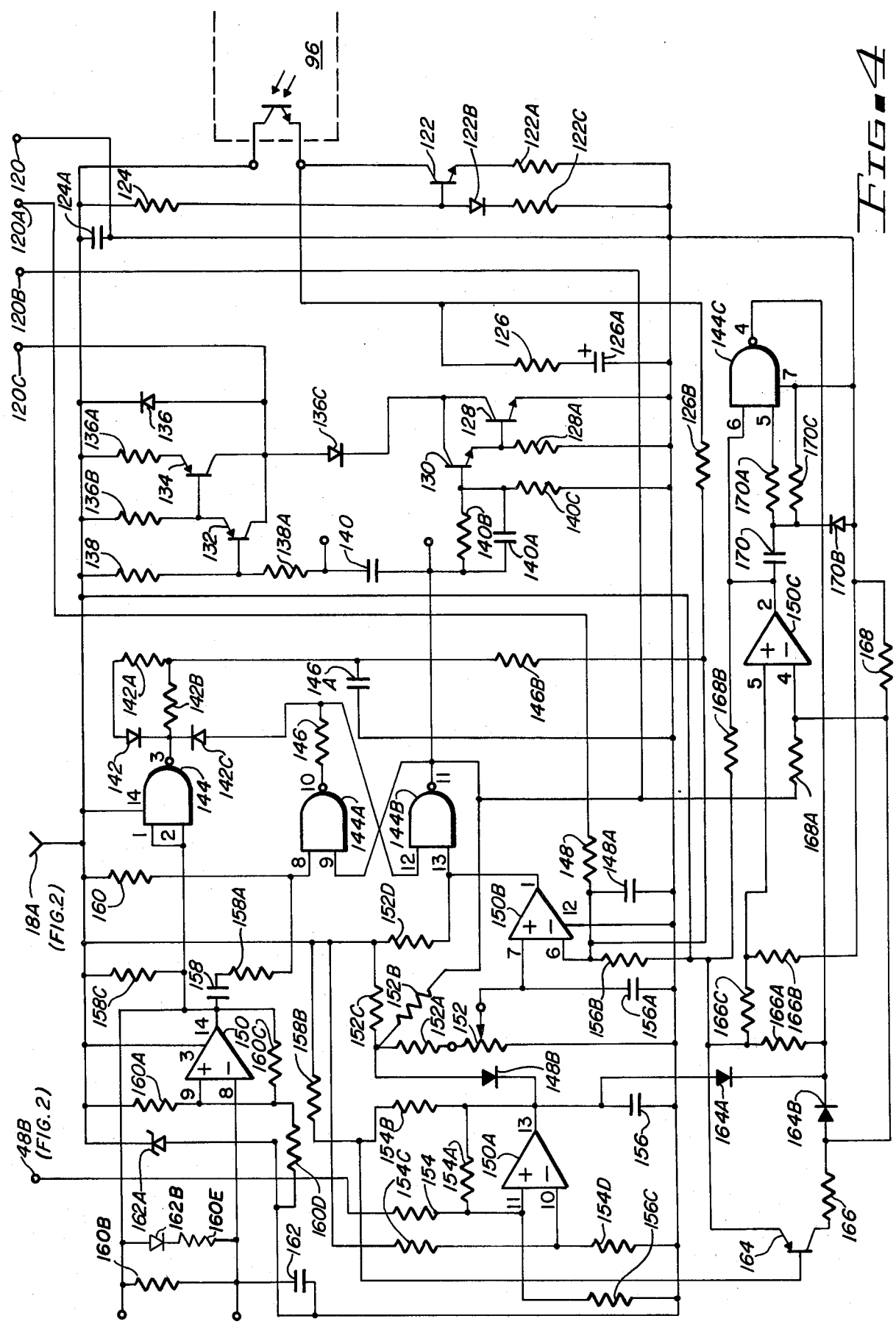
FIG. 4 is a schematic diagram of a variable pulse converter driver and master oscillator.

FIG. 4 is a schematic diagram of a variable width pulse modulator which provides controlled input to the base of the main converter transistor 58 through transformer 50, as shown in FIG. 3. With the exception of a few outboard components, FIG. 4 comprises a thick film hybrid circuit which includes a CD4011 complementary MOS, two input QUAD NAND gate, an LM339 QUAD voltage comparator, six transistors and seven diodes plus resistors and capacitors for proper operation. The SG3524 commercial hybrid chip by the Silicon General Co. is an approximate counterpart of the circuit shown in FIG. 4. The SG3524 draws more current than the pulse modulator shown in FIG. 4; thus, the dropping resistors used to supply voltage for housekeeping functions must be halved in ohmic value and doubled in wattage rating.

The input lead 18A from FIG. 2 LED 46 and dropping resistors 44 and 44A provides a common 15 volt positive lead to the pulse modulator and is connected to the cathode a 1N5245 15 volt zener diode, 220K ohm resistor 160A, the positive input terminal 3 of LM 339, IC 150, 22K ohm resistor 158C, 10K ohm resistor 160, positive input terminal 14 of CD4011 of NAND gate 144, 2.7K ohm resistor 138, 1000 ohm resistor 136B, 22 ohm resistor 136A, the cathode of 1N4148 diode 136, 470K ohm resistor 124, 1 uf, 16 volt capacitor 124A, and the collector of the light activated NPN transistor portion of optoelectric coupler MCT2E 96.

Terminal 120 is connected to the negative lead of the main power supply. Terminal 120 provides a common negative return for the components in the circuit of FIG. 4. Negative return 120 is connected to one terminal of the following components: 4.7K ohm resistor 122A, 22K ohm resistor 122C, 1 uf 15 volt capacitor 126A, the emitter of MPS 2222 NPN transistor 128, 100 ohm resistor 128A, 22K ohm resistor 140C, 220 pf capacitor 148A, 0.01 capacitor 156A, 1 uf 16 volt capacitor 156, 470K ohm resistor 154D, 220 pf capacitor 162, the anode of 1N5245 15 volt zener diode 162A, and 220K ohm resistor 160D.

The other end of resistor 160D is connected to 220K ohm resistor 160C which in turn is connected to terminal 14 of LM 399 IC 150. Resistor 160D is also connected to terminal 9 of IC 150 and to one end of 220K ohm resistor 160A the other end of which is connected to the plus 15 volt supply load. Terminal 8 of IC 150 is connected to 160K ohm resistor 160B which in turn is connected to terminal 14 of IC 150. Output 14 of pulse generator master oscillator IC150 is connected to negative input 8 through the series connection of diode 162B and resistor 160E. Output terminal 14 of IC 150 is connected to one terminal of 50 pf capacitor 158 the other end of which is connected to 1K ohm resistor 158A which in turn is connected to terminal 8 of Quad NAND gate 144A and to 10K ohm resistor 160 which in turn is connected to the plus 15 volt supply lead. Output terminal 14 of IC150 is also connected to terminals 1 and 2 of Quad NAND gate 144 and to 22K ohm resistor 158C. The other end of resistor 158C is connected to the plus 15 volt lead. Terminal 14 of gate 144 is also connected to the plus 15 volt lead. Terminal 3 of NAND gate 144 is connected to the cathodes of 1N4148 diodes 142 and 142C and to one end of 470K ohm resistor 142B. The anode of diode 142 is connected to one end of 22K ohm resistor 142A the other end of which is connected to resistor 142B which is also connected to the pulse modulator voltage input lead through 1.5 meg ohm resistor 146B. A 100 pf capacitor 146A is connected from the connection of 142B and 146B to the common negative lead. The anode of diode 142C is connected to terminal 12 of NAND gate 144B and to terminal 10 of NAND gate 144A through 22K ohm resistor 146. Terminal 9 of NAND gate 144A is connected to terminal 11 of NAND gate 144B, to one terminal of 100 pf capacitor 140, one terminal of 10 pf capacitor 140A and one terminal of 47K ohm resistor 140B.

Terminal 11 of NAND gate 144B furnishes the pulse input to a four transistor darlington/complementary PNP/NPN combination designed to drive the base of main power converter transistor (58 in FIG. 3) via active external lead 120C to transformer 50 in FIG. 3. The other terminal of capacitor 140 is connected to 10K ohm resistor 138A, the other end of which is connected to the base of MPS an 2907 PNP transistor 132 and a 2.7K ohm resistor 138. The other end of resistor 138 is connected to the plus 15 volt supply. The emitter of transistor 132 is connected to the base of another MPS2907 PNP transistor 134 and to one lead of a 1000 ohm resistor 136B, the other end of which is connected to the plus 15 volt supply. The emitter of transistor 134 is connected to the plus 15 volt supply through 2.2K ohm resistor 136A. The collector of transistor 134 is coupled to the anode of diodes 136 and 136C. The cathode of diode 136 is connected to the plus 15 volt supply.

The parallel combination of capacitor 140A and resistor 140B is connected to the base of an MPS5172 NPN transistor 130 and to the common negative lead through a 22K ohm resistor 140C. The collector of transistor 130 is connected to the collector of an MPS 2222 NPN transistor 128 and to the cathode of diode 136C. The emitter of transistor 130 is connected to the base of transistor 128 and to the common negative lead through 100 ohm resistor 128A. The emitter of transistor 128 is connected to the negative lead.

The voltage control signal enters the pulse width modulator/drive circuit from the voltage controller shown in FIG. 3 via a MCT2E opto isolator 96. The collector of the NPN light activated transistor in 96 is connected to the plus 15 volt supply line. The emitter of the light activated transistor is connected to the collector of an MPS5172 NPN transistor 122. The emitter of transistor 122 is connected to the common negative lead through a 4.7K ohm resistor 122A. Transistor 122 is biased into conduction to serve as a load impedance for light activated transistor 96 by a 470K ohm resistor 124 connected from the plus 15 volt supply to its base and by an 1N4148 diode 122B and a 22K ohm resistor 122C connected from the base of transistor 122 to the common negative lead. The emitter of light activated transistor 96 is also connected to terminal 6 of IC 150 B through a 220K ohm resistor 126B. The emitter of light activated transistor 96 is shunted to the common negative lead by 2.2K ohm resistor 126 and 1 uf 16 volt capacitor 126A. Terminal 6 of IC 150 B which functions as a pulse width modulator is also connected to one terminal of 220 pf capacitor 148A, to one end of 15K ohm resistor 148 and to one end of 1.2 Megohm resistor 156B. Capacitor 148A connected to the common negative lead and resistor 148 is connected to external control line 120A which is connected to the 0.1 ohm current sensing resistor in series with the main converter input (resistor 104 in FIG. 3). The other end of resistor 156B is connected to the plus 15 volt supply. Terminal 12 of IC 150 B is connected to the common negative lead. Terminal seven of IC 150 B is connected to 0.01 capacitor 156A which in turn is connected to the common negative lead. Teminal 7 of IC 150B is also connected to the movable contact of 20K ohm adjustable resistor 152 which facilitates setting of the converter current limit. One terminal of resistor 152 is connected to the common negative and the other terminal is connected to a 470K ohm resistor 152A which in turn is connected to another 470K resistor 152C which is finally connected to the plus 15 volt supply. Ten megohm resistor 152B is connected from the midpoint of resistor 152A and 152C to circuit extension lead 120B which is connected to capacitor 110 and resistor 108 in FIG. 3, thus, sensing the voltage across the primary of transformer 50A. The anode of a 1N4148 diode 148B is also connected to the midpoint of R152A and R152C. Output terminal one of IC 150 B (the pulse width modulator) acts on terminal 13 of NAND gate 144B (part of the pulse generator). Terminal 13 of gate 144B is also connected to the plus 15 volt supply through a 47K ohm resistor 152D. The cathode of diode 148B is connected to output terminal 13 of IC 150 A, one megohm resistor 154A, 47K ohm resistor 154B, 1 uf 16 volt capacitor 156 and the anode of 1N4148 diode 164A. Resistor 154A is connected in a feedback configuration to the positive IC 150 A input terminal 11, which is also connected to the positive 300 volt DC supply (48B in FIG. 2) through a 470K ohm resistor 154 and to the common negative through 10K ohm resistor 156C. The negative input, terminal 10 of IC 150 A is connected to the common negative through 470K ohm resistor 154D and to the plus 15 volt supply through 470K ohm resistor 154C. The function of IC 150 A is to monitor the voltage of the commercial power input and modify the output of the main converter accordingly.

The cathode of diode 164A is connected to the cathode of a 1N4148 diode 164B and to terminal 4 of Quad NAND gate 144C. The anode of diode 164B is connected to 470K ohm resistor 166, to 470K ohm resistor 168, to 220K ohm resistor 168A and to the negative input terminal 4 of IC 150C. The other end of resistor 168A is connected to external connection 120B and to resistor 152B. The positive input terminal 5 of IC 150 C is connected to 470K ohm resistor 166B and to 470K ohm resistor 166C, the other end of which is connected to resistor 166A and to the plus 15 volt supply. The other end of resistor 166 is connected to the collector of an MPS2907 PNP transistor 164. The base of transistor 164 is connected to the midpoint of series connected resistors 158B and 154B. The emitter of transistor 164 is connected to the plus 15 volt supply. The plus 15 volt supply is also connected to 47K ohm resistor 168B the other end of which is connected to output terminal 2 of IC 150C, to one terminal of 0.01 uf capacitor 170 and to terminal 6 of gate 144C. The other terminal of capacitor 170 is connected to one terminal of 470K onm resistors 170A and 170C and the cathode of IN4148 diode 170B. The anode of diode 170B is connected to the common negative lead. The other end of resistor 170A is connected to terminal 5 of gate 144C, and resistor 170C is connected to the common negative lead as is terminal 7 of gate 144C. Transistor 164, IC 150C and gate 144C and associated components operate in conjunction with IC 150A to limit the output current of the main converter and to facilitate its shutdown and restart function.

Figure 5A:
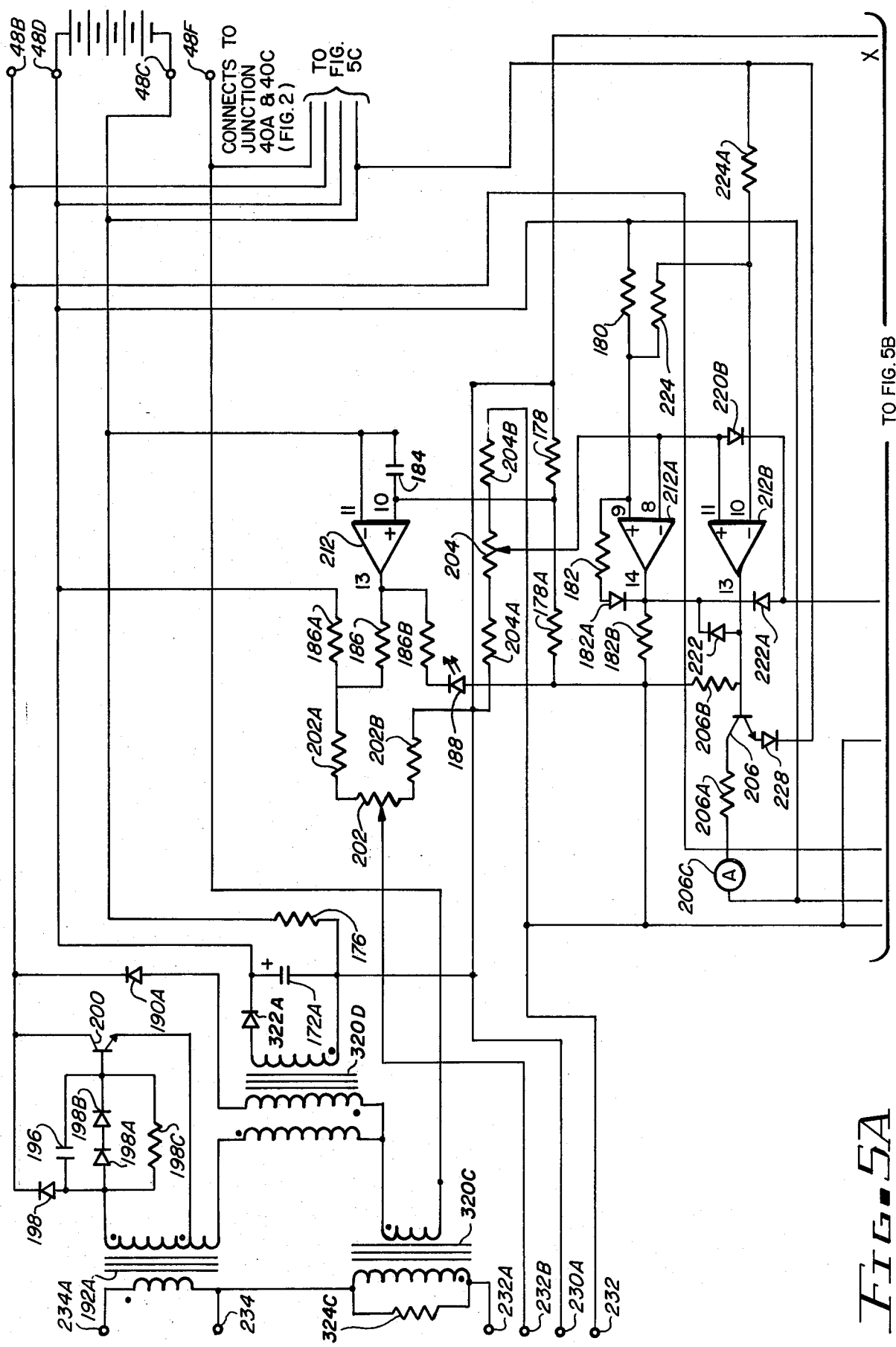
Figure 5B:
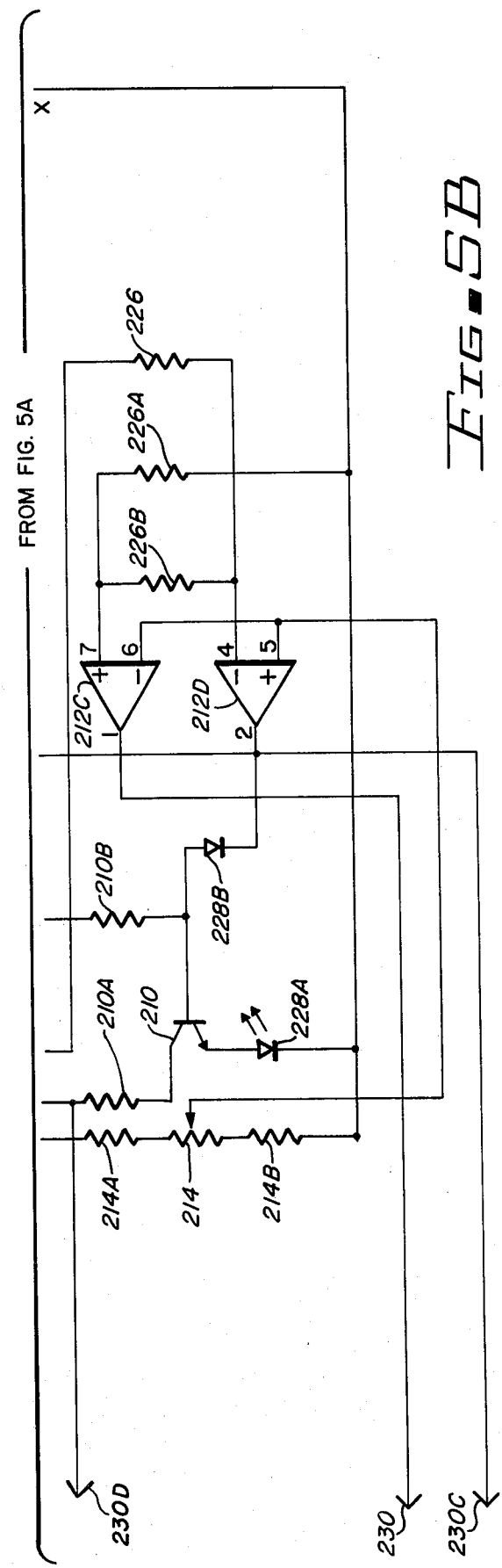

FIGS. 5A, 5B, and 5C show a dual converter battery and commercial powered supply with associated monitoring and control circuits. The post rectified positive 300 v commercial power enters the battery backup supply at 48B (from 48B in FIG. 2). The common negative lead is connected to terminal 48F. The common negative lead 48C connects to the output (finish) of the primary winding of current sense transformer 320A (FIG. 5C), one side of 0.01 uf capacitor 184, and to one side of a 0.01 ohm 2 watt resistor 176. The other side of resistor 176 connects to the start of the secondary winding of power transformer 320D. Power transformer 320D serves to charge and isolate the battery and logic circuitry from the AC line. The output (finish) of the secondary winding of power transformer 320D is connected to the anode of rectifying diode 322A. The cathode of diode 322A is connected to the positive side of filtering capacitor 172A, and to the positive terminal 48D of the main battery 48E. The positive 300 volt lead 48B is connected to the cathode of a MR856 snubber diode 190A, to the cathode of an MR817 protective diode 198, and to the collector of a MJE 12005 NPN transistor 200. The MJE 12005 is a switching transistor with a peak collector to emitter voltage rating of 1500 volts, and an average collector current of 8 amperes. The anode of protective diode 198 connects to the positive side of a shunting capacitor 196. The anode of MR856 power diode 190A is connected to the output (finish) of the snubber winding of power transformer 320D. The input (start) to the snubber winding of power transformer 320D is connected to the input (start) to the primary winding of current sensing transformer 320C, and to the output (finish) of the primary winding of power transformer 320D. The input (start) to the primary winding of power transformer 320D connects to the output of secondary winding of base drive transformer 192A. The output of the primary winding of current sensing transformer 320C connects to the secondary negative supply terminal 48F. The positive power supply terminal is also connected to one end of a 620K ohm 1% resistor 226 in FIG. 5B, the other end of which is connected to an 1.13K ohm 1% resistor 226B and the negative input terminal 4 of LM339 quad comparator IC212D. The other end of resistor 226B is connected to the positive input terminal 7 of comparator IC212C and to one end of a 14.76K ohm 1% resistor 226A, the other end of which is connected to the secondary negative supply lead and external lead 230A.

The emitter of battery charger switching transistor 200 is connected to the output (finish) of the secondary of base drive transformer 192A. The output (start) end of the secondary of transformer 192A is connected to one anode of two series connected 1N400 biasing diodes. The cathode of the second diode is connected to the base of power transistor 200. The series connected diodes are shunted by a 100 ohm resistor 198C and a 220 uf 16 volt capacitor 196. The primary of transformer 192A is connected to one of the pulse modulators in FIG. 6 via terminals 234 and 234A. Terminal 234, in addition, connects to the output (finish) of the secondary winding of current sensing transformer 320C and to voltage limiting resistor 324C. The other end of resistor 234C connects to the input (start) of the secondary winding of current sensing transformer 320C, and to terminal 232A to FIG. 6.

Figure 6:
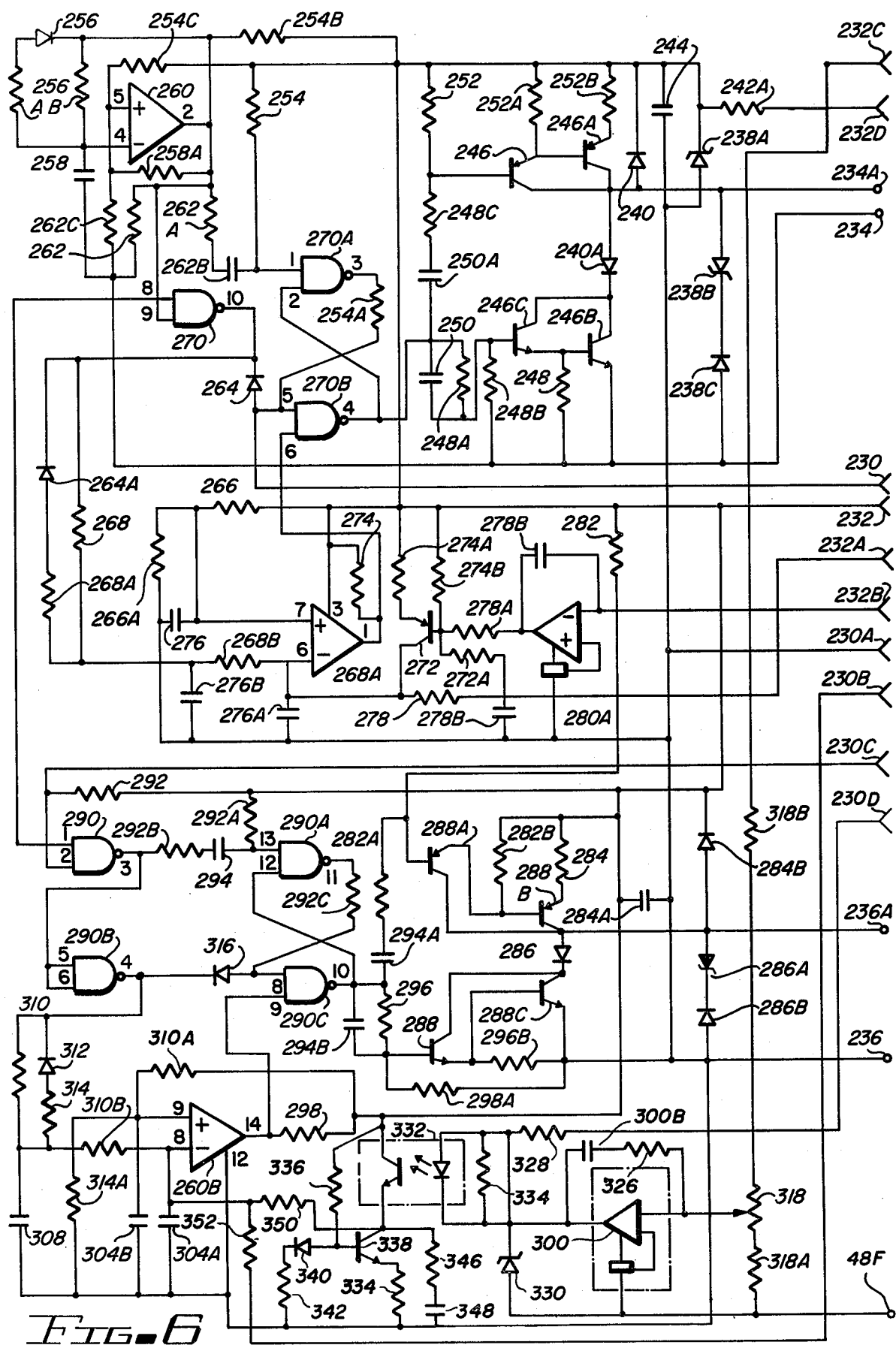
FIG. 6 is a schematic diagram of variable pulse width drivers for the battery output up-converter and the battery charger.

The positive battery terminal 48D is also connected, in FIG. 5C, to the cathode of a MR817 protective diode 216, the collector of a 2N5038 NPN transistor 208, to the cathode of power diode 216D, and to terminal 232D to FIG. 6. The 2N5038 transistor is a 20 ampere silicon-transistor with a collector-emitter voltage rating of 150 volts. The emitter of transistor 208 is connected to a feedback tap on the secondary of up-converter transformer 220. The output of the secondary of transformer 220 is connected to the input (start) of the primary winding of a power transformer 320B, the output (finish) of which connects to the input (start) of the snubber winding of power transformer 320B and to the input (start) to the primary winding of current sensing transformer 320A. The output (finish) of the snubber winding of power transformer 320B is connected to the anode of snubber diode 216D. The start to the secondary winding of power transformer 320B is connected to the secondary negative supply terminal 48F (FIG. 5A), and to the negative side of a filtering capacitor 172. The positive side of capacitor 172 connects to the cathode of rectifying diode 322, the anode of which connects to the output (finish) of the primary winding of power transformer 320B. The junction of the rectifying diode 322 and the filtering capacitor 172 connects to the positive supply terminal 48B (FIG. 5A). As in the charger circuit, the power transformer 320B acts to isolate the battery 48E from the AC line, and to step up battery voltage to power the load during a commercial power outage. The start (output) of the secondary winding of transformer 220 is connected to the anode of protective diode 216 and to one anode of a pair of series connected 1N4001 biasing diodes 216A and 216B. The cathode of diode 216B is connected to the base of transistor 208, and both diodes are shunted by a 0.1K ohm resistor 216E and a 220 uf 16 volt capacitor 216C. The primary terminals of transformer 220 are connected to a pulse modulator in FIG. 6 via terminals 236 and 236A. Terminal 236, in addition, connects to logic common along with the output (finish) of the secondary winding of current sensing transformer 320A at terminal 236, and the voltage limiting resistor 324A. The other end of resistor 324A connects to the start (output) of the secondary winding of current sensing transformer 320A, and to terminal 230B to FIG. 6.

The negative input terminal 11 of LM339 quad comparator IC212 is connected to the common negative battery terminal 48C. The positive input terminal 10 is connected to one terminal of a 0.01 capacitor 184, to a 150 ohm biasing resistor 178, and to a 150K ohm biasing resistor 178A. The other end of resistor 178 is connected to the logic common 230A, and the other side of resistor 178A is connected to the +15 volt housekeeping supply. Output terminal 13 of IC212 is connected to one end of a 961K ohm 1% resistor 186 the other end of which is connected to a 412K ohm 1% resistor 186A. The other end of resistor 186A is connected to the plus 48 volt supply 48D. Resistor 186 is also connected to a 100K ohm 1% resistor 202A the other end of which is connected to an adjustable 20K ohm resistor 202 which is connected to the common negative through another 20K ohm 1% resistor 202B. IC212 is one of a quad comparator unused in the circuit of FIG. 6 and is not a part of the IC quad comparator 212A through 212D in FIGS. 5A and 5B. The adjustable tap on resistor 202 is connected to output terminal 232B to FIG. 6 and provides an initial voltage adjustment of the battery charger converter.

A 1200 ohm resistor 204A, a 20K ohm adjustable resistor 204 and a 62K ohm resistor 204B are connected in series from the common battery negative lead 48C to a plus 15 volt supply circuit which is provided on lead 232 from FIG. 6. The adjustable center contact on resistor 204 is connected to negative input terminal 8 on IC212A, to positive input terminal 11 of IC212B and to the anode of 1N4148 diode 220B. The cathode of diode 220B is connected to the anode of a 1N4148 diode 222A, to output terminal 2 of IC 212D, to the cathode of a 1N4148 diode 228B and to circuit output lead 230C. The anode of diode 228B is connected to one end of 27K ohm resistor 210B and to the base of an MPS 2222 NPN transistor 210. The emitter of transistor 210 is connected to the anode of a light emitting diode 228A. The cathode of LED 228A is connected to the secondary negative terminal. The collector of transistor 210 is connected to one end of resistor 210A which is connected to the plus 48 volt battery lead 48D. The other end of resistor 210B is connected to the plus 15 volt housekeeping supply lead 232. The 15 volt supply is also connected to 47K ohm resistor 214A which is connected to a 50K ohm adjustable resistor 214 which, in turn, is connected to another 47K ohm resistor 214B which is connected to the secondary negative lead. The movable center contact of resistor 214 is connected to the plus input terminal 5 of IC212D and to the negative input terminal 6 of IC 212C.

The 48 volt battery supply from 48D is connected to alarm buzzer 206C, which is then connected to a 2.7K ohm resistor 206A which is in turn connected to the collector of an MPS 2222 transistor 206. The emitter of transistor 206 is connected to the anode of a 1N4148 diode 228 whose cathode is connected to the common negative battery circuit from 48C. The base of transistor 206 is connected to a 75K ohm resistor 206B, to the anode of a 1N4148 diode 222 and to the output terminal 13 of IC212B. The other end of resistor 206B is connected to the +15 volt supply line. The cathode of diode 222 is connected to the cathode of another 1N4148 diode 222A the anode of which is connected to output terminal 2 of IC212D, to the cathode of diode 228B and to external connection 230C. The cathode of diode 222 is also connected to the cathode of a 1N4148 diode 182A, to a 100K ohm resistor 182B which in turn is connected to the plus 15 volt supply and to the output terminal 14 of IC212A. The anode of diode 182A is connected to one end of a 310K ohm resistor 182 the other end of which is connected to the positive input terminal 9 of IC212A. Output terminal 1 of IC212C is connected to external lead 230.

The plus 15 volt housekeeping supply is also connected to the anode of light emitting diode 188, the cathode of which is connected to 1500 ohm resistor 186B the other end of which is connected to output terminal 13 of IC212. The positive 48 volt battery lead 48D is connected to 40K ohm 1% resistor 180 the other end of which is connected to the positive input terminal 9 of IC212A and to a 2.12K ohm 1% resistor 224. The other end of resistor 224 is connected to the negative input terminal 10 of IC212B. Terminal 10 of IC212B is connected to the common negative lead 48C through a 48K ohm 1% resistor 224 A.

The circuit shown in FIG. 6 includes pulse width modulators and transistors drivers for the battery charger converter, the battery operated power converter, two voltage controllers and control circuits for stopping and starting the pulse modulators based on data supplied by the circuit in FIG. 5.

Operating potential for semiconductors in FIG. 6 is introduced at 232D which is connected to the plus 48 volt battery supply. The positive terminal of a 22 uf 16 volt capacitor 244, the cathode of zener 238A, and the balance of the plus 15 volt housekeeping loads included in the circuit of FIG. 6 are connected to 232D and all other loads through 3.6K ohm 5 watt resistor 242A. Thus the 15 volt supply is derived from the isolated 48 volt battery supply.

The 300 volt DC input at terminal 232C is connected to a series of three resistors the other end of which is connected to the unisolated negative lead at 48F. The unisolated negative lead terminal 48D differs from the logic common and battery negative. The 300 volt input is connected to a 620K ohm resistor 318B then to a 50K ohm adjustable resistor 318 and to the unisolated negative through a 4.7K ohm resistor 318A. The movable contact on resistor 318 is a selectable fraction of the commercial line input voltage or the voltage generated by the battery driven up-converter. The center contact on resistor 318 is connected to the negative input terminal of a TL 430 shunt regulator 300. The negative input terminal of shunt regulator 300 is also connected to the output through the roll off network comprised of the series connection of 15K resistor 326 and 0.01uf capacitor 300B. The output of regulator 300 is connected to the circuit input lead 230D through 62K current sourcing resistor 328, the cathode of 7.5 v protective zener diode 330, one side of 7.3 ohm current shunting resistor 314, and to the cathode of the light generator of the optical coupler 332. The anode of zener diode 330 is connected to the extra unisolated negative terminal 48F. The anode of the light generator of the optical coupler 332 is connected to the other side of resistor 334, and the output of op-amp 300.

The collector of the optical coupler 332 is connected to the 15 volt supply terminal 232, through 470K resistor 336 to the base of 2N5172 transistor 338, and the anode of 1N4148 diode 340. The cathode of diode 340 is connected to logic common through 10K resistor 342. The emitter of transistor 338 is also connected to logic common through 4.7K resistor 344. The emitter of the optical coupler 332 is connected to the collector of transistor 338, to one side of the series connected roll off network comprised of 15K resistor 346 and 0.33 uf capacitor 348, and to the negative input pin 8 of LM339 quad comparator IC260B through 15K resistor 350. The optical coupler 332 serves to isolate logic circuitry and battery 48E from AC commercial line. The series connected resistor 346 and capacitor 348 serve to provide a RC constant to limit loop response at frequencies above 100 Khz. Transistor 338 and its biasing circuitry provide a constant current source to offset non-linearity associated with optically coupled LED 332. The negative input pin 8 of IC260B is also connected to the current sensing transformer 230B through 120K resistor 352, one side of a 1.5 megohm resistor 310B, and one terminal of a 220 pf capacitor 304A. The other side of capacitor 304A is connected to the logic common as is terminal 12 of IC260B. The other end of resistor 310 B is connected to a 100 pf capacitor 308 which is also connected to logic common, to one end of a 470K ohm resistor 310, and to one end of a 22K ohm resistor 314 to the other end of which is connected to the anode of a 1N4148 diode 312. The cathode of diode 312 and the other end of resistor 210 are connected to terminal 4 of a CD 4011 quad two-input NAND gate 290B. Positive input terminal 9 of IC260B is connected to the plus 15 volt supply through a 470K ohm resistor 310A and to the logic common through a 47K ohm resistor 314A. Terminal 9 of IC260B is also bypassed to logic common through a 0.01uf capacitor 304B. The output-terminal 14 of pulse width modulator IC260B is connected to terminal 9 of NAND gate 290C, and to the 15 v housekeeping supply through 15K resistor 298. Terminal 8 of gate 290C is connected to terminal 11 of gate 290A through a 22K ohm resistor 292C and to the anode of a 1N4148 diode 316. The cathode of diode 316 is connected to terminal 4 of gate 290B. Terminal 10 of gate 290C is connected to terminal 12 of gate 290A. Terminal 13 of gate 290A is connected to the plus 15 volt supply through a 10K ohm resistor 292A and to terminal 3 of gate 290 through a 470 pf capacitor 294 and a 10K ohm resistor 292B. Terminal 3 of gate 290 is also connected to terminals 5 and 6 of gate 290B. Terminal 2 of gate 290 is connected to the plus 15 volt supply through a 100K ohm resistor 292 and to external connection 230C which is part of the circuitry in FIG. 5 which mediates operation of the battery charger converter and the battery powered up-converter. Terminal 1 of gate 290 is connected to terminals 8 and 9 of gate 270 and to terminal 2 of IC260 which operates as a master oscillator for both pulse modulator circuits shown in FIG. 6. Pulse modulators shown in FIG. 6 differ in other details from the pulse width modulator shown in FIG. 4 designed for driving the main power converter, although a similar four transistor complementary Darlington circuit is used for driving each power converter transistor.

Terminal 10 of gate 290C is connected to one terminal of a 10 pf capacitor 294A the other end of which is connected to base of an MPS 2907 PNP transistor 288A through a 10K ohm resistor 282A. The base of transistor 288A is also connected to the plus 15 volt supply through a 2.7K ohm resistor 282. The emitter of transistor 288A is connected to the base of another MPS 2907 transistor 288B and to the plus 15 volt supply through a 1000 ohm resistor 282B. The emitter of transistor 288B is connected to the plus 15 volt supply through a 22 ohm resistor 284. The collector of transistor 288A is connected to the collector of transistor 288B, the anode of an 1N4148 diode 286 and to external output load 236A. 1N4148 diode is connected from output lead 236A with the cathode connected to the plus 15 volt supply. Terminal 10 of gate 290C is also connected to one terminal of a 100 pf capacitor 294B and a 47K ohm resistor 296. The other terminals of capacitor 294B and resistor 296 are connected to the base of an MPS 2222 NPN transistor 288. The collector of transistor 288 is connected to the collector of another MPS 2222 transistor 288C and to the cathode of diode 286. The emitter of transistor 288 is connected to the base of transistor 288C and to a 100 ohm resistor 296B which in turn is connected to the auxiliary negative lead and to external output lead 236. The emitter of transistor 288C is connected to the common negative lead. Outputs 236A and 236 are connected to the corresponding primary terminals of transformer 220, the battery up-converter in FIG. 5. The cathode of a 1N5245 zener diode 286A is connected to the active output of the transistor driver lead 236A. The anode of zener diode 286A is connected to the cathode of 1N4148 diode, the anode of which is connected to the auxiliary negative lead which is also the passive return for transistor driver lead 236A.

The battery charging voltage adjustment from the movable tap on resistor 202 in FIG. 5 is connected to input terminal 232B which in turn is connected to the negative input terminal of a TL430 operational amplifier 280 and through a 0.1 uf capacitor 278B to the output of op amp 280. The positive input to op amp 280 is connected to the common negative lead through a 2.7 volt zener regulator 280A. The common negative enters the circuit from FIG. 5 on 232A and is also connected to one end of a 15K ohm resistor 278. The output of op amp 280 is connected to the base of an MPS 2907 PNP transistor 272 through a 150 ohm resistor 278A. The base of transistor 272 is connected to the plus 15 volt supply through another 150 ohm resistor 274B and to the auxiliary negative supply lead through a 2.7K ohm resistor 272A and a 1 uf capacitor 278B. The collector of transistor 272 is connected to the other end of 15K ohm resistor 278 and to the negative input terminal 6 of IC 268A which functions as the pulse modulator for the battery charging converter. Terminal 6 of IC 268A is bypassed to the auxiliary negative lead with a 220 pf capacitor 276A. Terminal 6 of IC 268A is also connected to terminal 10 of NAND gate 270 through a 1.5 megohm resistor 268B and a 47K ohm resistor 268. The junction of resistor 268B and 268 is bypassed to the auxiliary negative with a 100 pf capacitor 276B. Resistor 268 is shunted by a 22K ohm resistor 268A in series with a 1N4148 diode 264A with its cathode connected to terminal 10 of gate 270. The positive input 7 of pulse modulator IC 268A is connected to the plus 15 volt supply through a 470K ohm resistor 266 and to the auxiliary negative through a 47K ohm resistor 266A. Terminal 7 of IC 268A is bypassed to the auxiliary negative lead through a 0.01 uf capacitor 276. Output terminal 1 of IC 268A is connected to input terminal 6 of gate 270B. Terminal 3 of IC 268A is connected to the plus 15 volt supply which is also connected to terminal 1 through a 47K ohm resistor 274. Terminal 5 of gate 270B is connected to terminal 3 of gate 270A through a 22K ohm resistor 254A. Terminal 5 of gate 270B is also connected to external control terminal 230 and to the anode of a 1N4148 diode 264, the cathode of which is connected to terminal 10 of gate 270. Terminal 1 of gate 270A is connected to output terminal 2 of master oscillator IC 260 through a 47 pf capacitor 262B and a 1000 ohm resistor 262A. Terminal 1 of gate 270 is also connected to the plus 15 volt supply through a 10K ohm resistor 254. Terminal 2 of gate 270A is connected to output terminal 4 of gate 270B.

Positive input terminal 5 of master oscillator IC 260 is connected to the plus 15 volt supply through a 220K ohm resistor 254C and to the auxiliary negative lead through another 220K ohm resistor 262C. Terminal 5 is also connected to output terminal 2 of IC 260 through a 220K ohm resistor 258A. Output terminal 2 of IC 260 is also connected to the plus 15 volt supply through a 22K ohm resistor 254B and to negative input terminal 4 through a 160K ohm resistor 256B. Resistor 256B is shunted by a 1N4148 diode 256 in series with a 22K ohm resistor 256A. The cathode of diode 256 is connected to terminal 2 of IC 260. Terminal 4 of IC260 is bypassed to the auxiliary negative lead with a 220 pf capacitor 258.

Terminal 4 of gate 270B provides the driving pulses for the four transistor complementary darlington circuit which drives the base of the battery charger converter transistor. Terminal 4 of gate 270B is connected to one terminal of a 100 pf capacitor 250A, the other terminal of which is connected to one end of a 10K ohm resistor 248C the other end of which is connected to the base of an MPS 2907 PNP transistor 246 and to the plus 15 volt supply through a 2.7K ohm resistor 252. The emitter of transistor 246 is connected to the base of another MPS 2907 transistor 246A and to the plus 15 volt supply through a 1000 ohm resistor 252A. The emitter of transistor 246A is connected to the plus 15 volt supply through a 22 ohm resistor 252B. The collector of transistor 246 is connected to the collector of transistor 246A, to the anode of a 1N4148 diode 240, to the anode of a 1N4148 diode 240A, to the anode of a 1N5245 zener diode 238B and to the active output lead 234A. The cathode of diode 240 is connected to the plus 15 volt supply. The cathode of zener diode 238B is connected to the cathode of 1N4148 diode 238C, the anode of which is connected to the auxiliary negative lead which is also connected to the passive transistor driver output lead 234.

Terminal 4 of gate 270B drives the opposite polarity of the complementary driver circuit through a 47K ohm resistor 248A in parallel with a 10 pf capacitor 250 connected to the base of an MPS 2222 NPN transistor 246C which is also connected to the auxiliary negative lead through a 22K ohm resistor 248B. The collector of transistor 246C is connected to the collector of another MPS 2222 transistor 246B and to the cathode of diode 240A which links the combination to the PNP transistors. The emitter of transistor 246C is connected to the base of transistor 246B and to the auxiliary negative lead through a 100 ohm resistor 248. The emitter of transistor 246B is directly connected to the auxiliary negative lead. The plus 15 volt supply is extended to 15 volt loads in the circuit of FIG. 5 via external lead 230A.

While the invention has been described with respect to a preferred embodiment, it will be apparent to those skilled in the art that various modifications and improvements can be made without departing from the scope and spirit of the invention. For example, the invention as described can be conveniently constructed in three modular units, i.e. a transformerless AC to DC power supply, a DC to DC switching voltage changing converter with integral voltage regulation and protective circuitry and a battery powered emergency supply with a floating charge capability and a full powered battery to line converter with capacity to carry the desired load for one hour or longer. For example, the battery container can be remotely located where size or other considerations so dictate. For example, the entire installation (not just the low-voltage output) can be isolated by using a two winding 60 cycle transformer ahead of the commercial power rectifier in the power supply without interferring in any way with the battery powered no-break feature. For example, the power output of the converter/battery power combination can be scaled down (or up) by substitution of appropriate power transistors and ferrite cored transformers. For example, the output of a battery of series connected photovoltaic cells can be substituted for the commercial power pre-rectifier components. By raising the capacity of the battery installation, the invention can carry a reasonable percentage of nighttime and cloudy day loading.

Accordingly, it should be understood that the invention should not be limited by the specific embodiment described in the specification herein, but only by the scope of the appended claims.

What is claimed is:

1. A non-interrupting power supply for supplying DC power to a load, comprising: input means adapted to be coupled to a source of AC power; first means coupled to said input means and to said load for converting said AC power to DC power for utilization by said load; second means for storing DC power; charging means coupled to said input means and to said second means for charging said second means; third means coupled to said input means and to said second means for sensing the failure of said source of AC power; fourth means coupled to said first means and to said second means and responsive to said third means for supplying power from said second means to said first means upon failure of said source of AC power; and regulating means coupled to said load and said first means for regulating the DC-power produced by said first means in accordance with load requirement, said regulating means comprises: a voltage regulator coupled to the output of said first means; a variable pulse width circuit having an output coupled to said first means; and an optoelectronic isolator for coupling the output of said voltage regulator to an input of said variable pulse width circuit.

2. A non-interrupting power supply for supplying DC power to a load, comprising: input means adapted to be coupled to a source of AC power; first means coupled to said input means and to said load for converting said AC power to DC power for utilization by said load; second means for storing DC power; charging means coupled to said input means and to said second means for charging said second means; third means coupled to said input means and to said second means for sensing the failure of said source of AC power; fourth means coupled to said first means and to said second means and responsive to said third means for supplying power from said second means to said first means upon failure of said source of AC power; and regulating means coupled to said load and said first means for regulating the DC-power produced by said first means in accordance with load requirement, said charging means comprises: a charging converter coupled to said first means for producing AC power; a pulse width modulator for driving said charging converter; a transformer coupled to said charging converter for reducing said AC power; and fifth means coupled to said transformer for converting the reduced AC power to DC power for charging said second means.

3. A power supply according to claim 2 wherein said fourth means includes:
   an up-converter coupled to said first means and to said transformer; and
   a variable pulse width driver for driving said up-converter.

4. A power supply according to claim 3 wherein said second means is a battery.

5. A power supply according to claim 4 wherein said input means includes an rf interference filter having an input coupled to said source of AC power.

6. A power supply according to claim 5 wherein said first means includes:
   a full-wave rectifier having an input coupled to the output of said rf interference filter; and
   a main supply converter having an input coupled to said full-wave rectifier and having an output adapted to be coupled to said load.

7. A power supply according to claim 6 further including controlling means coupled to said battery and to said charging means for sensing the voltage stored in said battery and controlling said charging means in response thereto.

* * * * *

UNITED STATES PATENT AND TRADEMARK OFFICE
CERTIFICATE OF CORRECTION

PATENT NO. : 4,384,214

DATED : May 17, 1983

INVENTOR(S) : Robert G. Crick et al.

It is certified that error appears in the above-identified patent and that said Letters Patent is hereby corrected as shown below:

On the title page, "[73] Assignee: Integrated Switching Supplies, Inc., Scottsdale, Ariz." should read -- [73] Assignee: Integrated Switching Systems, Inc., Scottsdale, Ariz. --.

Signed and Sealed this

Twenty-fourth Day of January 1984

[SEAL]

Attest:

GERALD J. MOSSINGHOFF

Attesting Officer

Commissioner of Patents and Trademarks